G. H. COMBS.
FOLDING CRATE.
APPLICATION FILED DEC. 4, 1915.
1,206,674.
Patented Nov. 28, 1916.
2 SHEETS—SHEET 1.
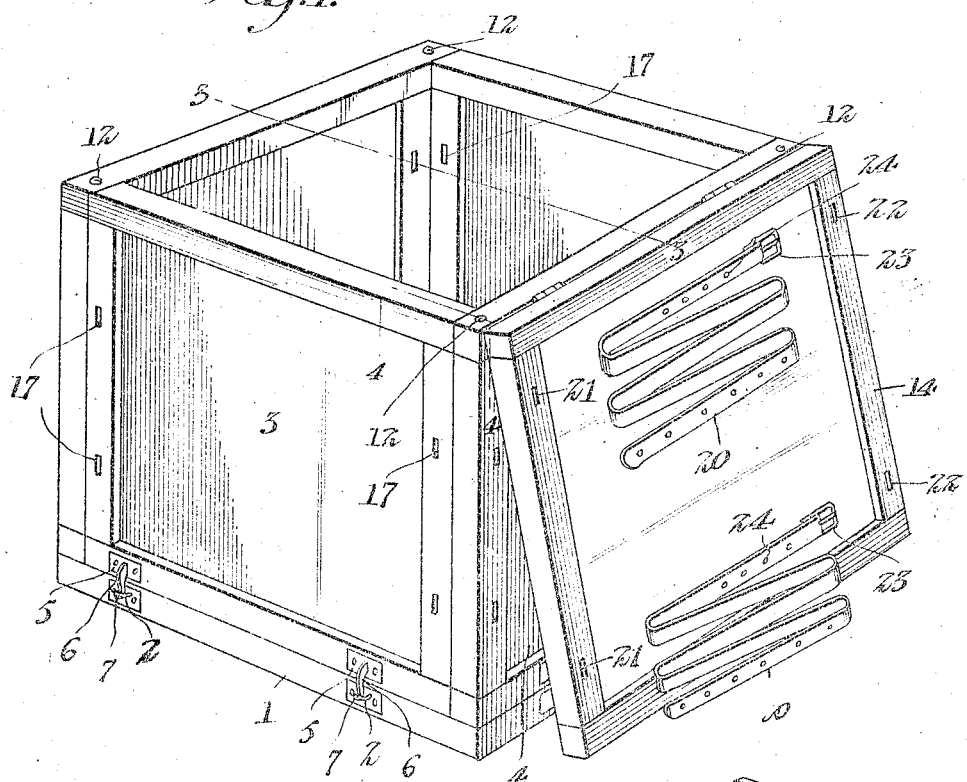
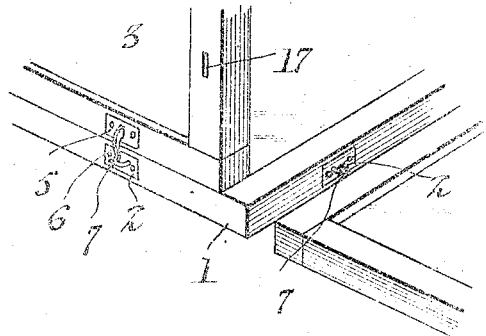
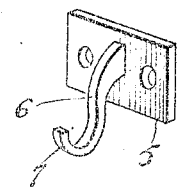
Witnesses
Frederick M. Ely
Inventor
George H. Combs
By Victor J. Evans
Attorney G. H. COMBS.
FOLDING CRATE.
APPLICATION FILED DEC. 4, 1915.
1,206,674.
Patented Nov. 28, 1916.
2 SHEETS—SHEET 2.
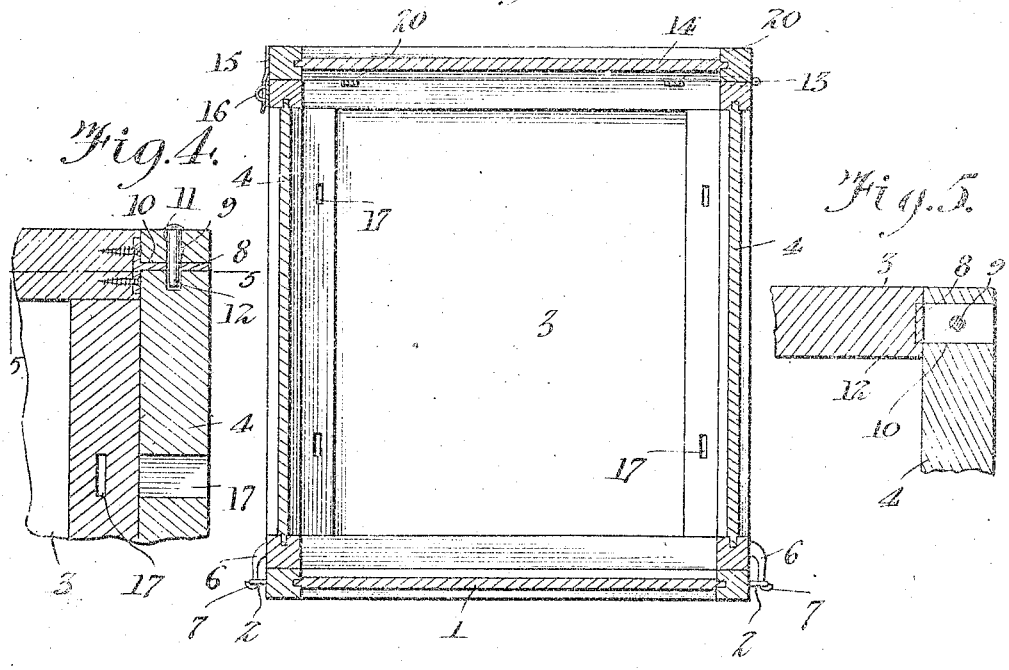
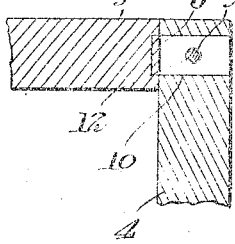
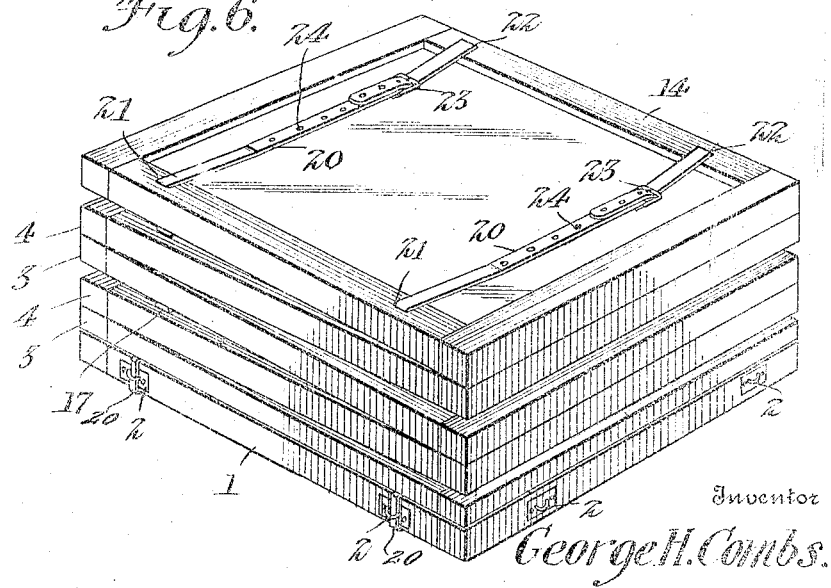
Inventor
George H. Combs.
By Victor J. Evans
Attorney
Witnesses
Frederick W. Ely

UNITED STATES PATENT OFFICE.

GEORGE H. COMBS, OF ITHACA, NEW YORK.

FOLDING CRATE.

1,206,674.

Specification of Letters Patent.  Patented Nov. 28, 1916.

Application filed December 4, 1915. Serial No. 65,113.

*To all whom it may concern:*

Be it known that I, GEORGE H. COMBS, a citizen of the United States, residing at Ithaca, in the county of Tompkins and State of New York, have invented new and useful Improvements in Folding Crates, of which the following is a specification.

This invention relates to certain new and useful improvements in folding crates and the primary object of the invention is to construct a device of this character which shall embrace novel means whereby the crate will be strong and rigid when in its set-up position and whereby the same may be compactly folded for the purpose of storage or return to its destination.

Another object of the invention is to provide a device of this character which shall be of a simple and economical construction, durable and efficient in its use, and one which may be folded compactly and locked in such folded condition, so as to insure the same against breakage or loss of parts, when stored or returned.

With the above and other objects in view, the improvement resides in the construction, combination and arrangement of parts set forth in the following specification and falling within the scope of the appended claims.

In the drawings: Figure 1 is a perspective view of a crate constructed in accordance with the present invention, Fig. 2 is a similar view illustrating the manner in which the side members or panels are arranged in setting up a crate, Fig. 3 is a sectional view approximately on the line 3—3 of Fig. 1, Fig. 4 is a greatly enlarged detail sectional view approximately on the line 4—4 of Fig. 1, Fig. 5 is a horizontal sectional view approximately on the line 5—5 of Fig. 4, Fig. 6 is a perspective view of a crate in its knocked down or folded condition, and Fig. 7 is an enlarged perspective view of one of the goose-neck or hook members provided upon the panels of the crate.

The bottom 1 may be in the nature of a flat board of either a square or rectangular formation, and the same is provided upon its edges, adjacent its corners, with outwardly extending eyes 2. The eyes are preferably in the nature of bail members connected with plates that are let in the edges of the bottom and secured thereto in any desired or preferred manner, and the eyes are disposed horizontally with relation to the bottom. The panels comprising the sides and ends are indicated by the numerals 3 and 4 respectively. These panels are of a length to rest snugly upon the upper face of the bottom 1 and to be arranged in a line with the edges of the bottom, and the ends of the side panels are contacted by the inner faces of the end panels, so that the opposite edges of the said edge panels will be arranged flush with the outer faces of the side panels. Secured to each of the panels, adjacent the opposite edges thereof are plates 5 provided with outwardly extending depending members 6 formed with hook-shaped ends 7, and the hooks of the members 6 are adapted to engage with the respective eyes 2 of the bottom. The members 6 are of a substantially gooseneck formation, and by reference to Fig. 2 it will be noted that the panels are arranged at an angle with relation to the bottom to permit of the hooks 7 entering the eyes 2 and further that when the panels are arranged on the bottom 1 and are disposed vertically thereof, the hooked ends of the members will frictionally engage with the eyes 2 to hold the lower edges of the panels in contact with the bottom so as to prevent the escape of the contents of the crate from between the panels and bottom.

The side panels 3, adjacent their upper corners are provided with longitudinally extending flat, preferably metallic tongues or tenons 8 which are provided each with an opening 9, and these tenons 8 are adapted to be received in mortises 10 provided in the end panels 4 adjacent the upper corners thereof. The panels 4 adjacent each of their corners are provided with a vertically disposed aperture 11 which passes through the mortise 10 and which is adapted to register with the opening 9 in each of the tenons 8, and inserted within each of the said apertures is a removable pin 12 which serves as locking means for securing the panels and for sustaining the same in proper upright position with relation to the base 1.

Hingedly secured to one of the end panels 4, as at 13, is the top or lid member 14. The lid is of a size and shape corresponding with the bottom 1 and when swung over the upper edges of the side and end panels will contact or cover the removable pins 12 to effectively hold the same in their locking position. The cover may be provided with a suitable hasp 15 arranged upon its edge opposite its hinges and the said hasp may engage with a suitable staple 16 in one of the end panels 1, so that a suitable lock may be inserted in the staple to effectively protect the crate and secure the lid in closed position. Of course, other securing means may be employed if desired.

The panels 3 and 4, adjacent their corner edges are provided with slots 17 which, when the panels are removed from the bottom and are arranged face to face upon the bottom, are adapted to aline, so that one of the pair of straps 20 after passing through said similar slots 21 in the lid may be inserted through the registering slots 17 in the panels and through two of the oppositely disposed pairs of eyes 2 of the bottom, and through a second pair of slots 22 in the lid 14 to engage with suitable buckles 23 provided upon the ends of the straps. The straps 20 are secured to the inner face of the lid 14 in any desired manner, such for instance, as through the medium of head members 24.

While it has been stated that the pins 12 are in the nature of removable elements, the same may be so constructed as to be permitted only a limited amount of sliding movement in the aperture 11 so that the same cannot be entirely withdrawn from the aperture, but as these pins may be also in the nature of ordinary nails, which may be easily obtained, the said pins may be entirely discarded if desired when the crate is in its knocked down condition.

From the above description, taken in connection with the accompanying drawings, the simplicity of the device, as well as the advantages thereof will, it is thought, be perfectly apparent to those skilled in the art to which such invention appertains without further description.

Having thus described the invention, what I claim is:

1. A crate, including a base having its edges provided with eyes, side and end panels resting on the base and having their edges contacting, members having hook-shaped ends rigidly secured to the outer faces of the panels and depending therefrom and engaging in the eyes on the base, tenons upon certain of the panels received in mortises in the other panels, means for locking the tenons in the mortises, and a hinged lid for the crate.

2. A knock-down crate including a flat bottom having its edges provided with eyes, side and end panels resting on the bottom at the edges thereof and the opposite edges of the side panels contacting with the inner faces of the end panels at the opposite edges of the said end panels, members of substantially goose-neck formation rigidly secured to the panels and engaging in the eyes of the bottom, tenon members projecting from the opposite edges of the side panels and entering mortises in the end panels, locking pins passing through apertures in the end panels and through openings in the tenons, a hinged lid upon one of the panels, and means for locking the lid to the crate.

3. In a knock-down crate, a flat bottom having its edges provided with eyes, side and end panels resting upon the bottom at the edges thereof, rigid hook members upon the panels engaging with the eyes, certain of the panels having projecting tenons entering mortises in the contacting panels, slidable locking means for the tenons, the panels adjacent their corners having slots, a lid hingedly secured to one of the panels, and strap members secured to the lid and adapted to be passed through the slots and through certain of the eyes of the bottom when the device is in its knocked-down position and the panels are arranged one upon the other over the base, substantially as described.

In testimony whereof I affix my signature in presence of two witnesses.

GEORGE H. COMBS.

Witnesses:
JENNIE McAULIFFE,
MILDRED H. SMITH.